July 17, 1923.

M. A. SWEET. ET AL 1,461,949

DIAL SCALE PRINTING DEVICE

Filed June 20, 1919

Inventors.
Melvin A. Sweet.
George W. Britton
by H. J. S. Dennison
atty.

July 17, 1923.

M. A. SWEET ET AL 1,461,949

DIAL SCALE PRINTING DEVICE

Filed June 20, 1919    2 Sheets-Sheet 2

Inventors.
Melvin A. Sweet
George N. Britton
by H. J. S. Dennison
atty.

Patented July 17, 1923.

1,461,949

UNITED STATES PATENT OFFICE.

MELVIN ARVINE SWEET AND GEORGE WILLIAM BRITTON, OF HAMILTON, ONTARIO, CANADA.

DIAL-SCALE PRINTING DEVICE.

Application filed June 20, 1919. Serial No. 305,516.

*To all whom it may concern:*

Be it known that we, MELVIN ARVINE SWEET and GEORGE WILLIAM BRITTON, a citizen of the United States of America and a subject of the King of Great Britain, respectively, and both residents of the city of Hamilton, Province of Ontario, in the Dominion of Canada, have invented certain new and useful Improvements in a Dial-Scale Printing Device, described in the following specification and illustrated in the accompanying drawings, that form part of the same.

The principal objects of the invention are, to enable a positive record of weights being taken from dial scales by the printing of the weight upon a record strip, and to devise a very simple form of attachment which may be operated with ease and accuracy.

The principal feature of the invention consists in the arrangement of indicating characters around the periphery of the dial and a concentrically operable member adapted to co-operate with the said characters to record the weight registered by the scale indicator.

In the drawings, Figure 1 is a plan view of the dial of a scale showing the preferred form of my printing device arranged thereon.

In the use of weigh scales it is extremely desirable that the weight registered upon the scale be indelibly recorded. This result has been achieved upon beam scales by the marking device being carried by the counterpoise which is moved along the beam but in dial scales the weight is indicated by a finely balanced rotating finger to which it is impossible to connect any recording means. The present invention therefore contemplates broadly the application of type recording means to a dial scale and the result may be accomplished in several ways.

Figure 1:
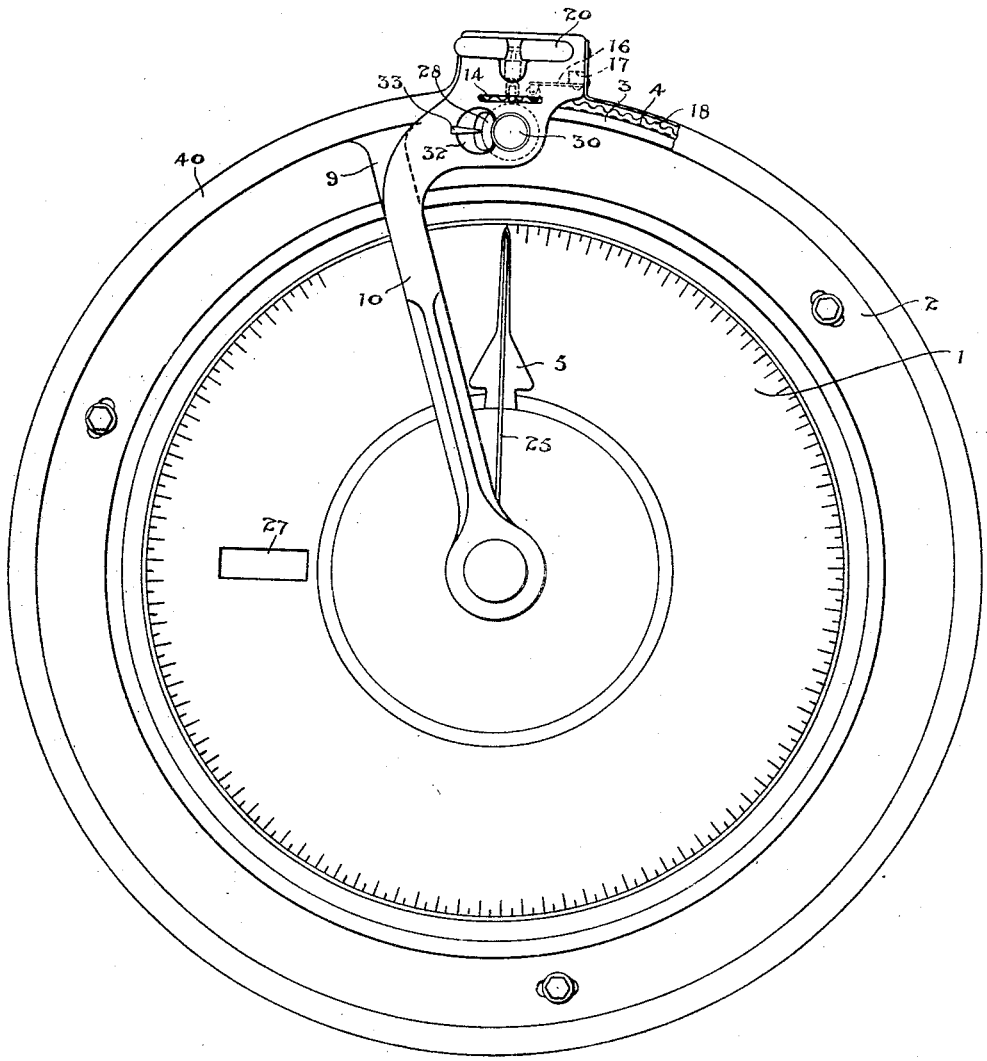
Figure 2:
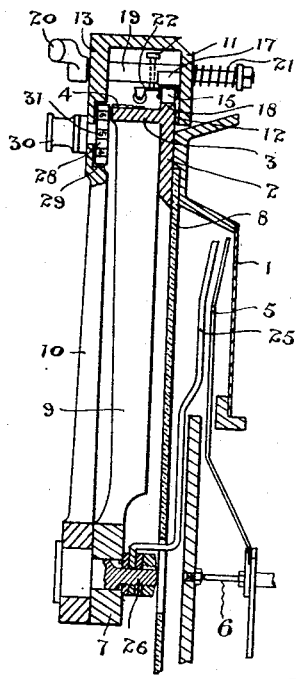
Figure 2 is a vertical sectional elevational view through the axis of the scale dial.
Figure 3:
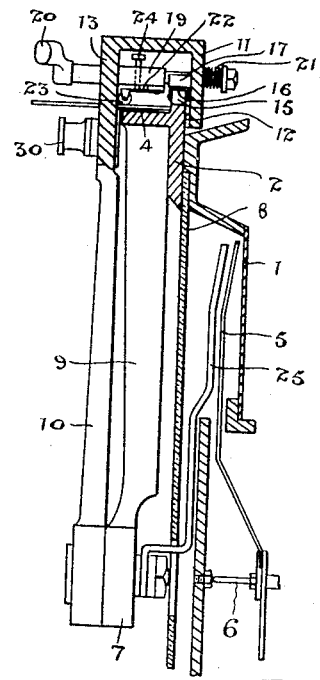
Figure 3 is a sectional view through the printing device showing the position of the parts in the printing operation.

In the form of the invention illustrated in Figures 1 and 2 the dial 1 is circumferentially enclosed by a stationary circular frame 2 which is provided with an outwardly extending cylindrical flange 3. Upon the perimeter of this flange is arranged a type plate 4 having numerals preferably arranged in radial relation with and corresponding to the numerals of the scale on the dial.

A weight indicating finger 5 is rotatably supported upon the spindle 6 arranged back of the centre plate 7 and it is preferably protected by a glass front 8.

An arm 9 secured to the frame 2 extends radially inward and forms the central bearing support 7 in axial alignment with the spindle 6 and upon the outer side of the arm 9 is rotatably mounted an arm 10 which extends radially from the centre and towards its outer end is preferably offset from the radial direction.

The outer extremity of the arm 10 extends beyond the perimeter of the frame 2 and projects over the same having an inwardly turned back portion 11 which is provided with friction contact points 12 adapted to engage the inward side of the frame rim 2. A housing is thus formed over the rim and through the front wall 13 of the housing there is formed a slot 14 which is arranged in line with the type surface of the type plate 4 so that a card inserted in the slot will pass over and be close to the face of the type.

The arm 10 is held in adjustable positions by means of a roller 15 carried upon a spring arm 16 arranged within the housing and preferably secured to a lug 17 on the back portion 11.

The roller 15 engages a toothed flange 18 secured to or formed upon the perimeter of the flange 3 of the stationary frame 2 and the teeth correspond in number with the type on the type plate 4 and the roller is so arranged as to rest between the two teeth when the centre of the slot 14 is opposite to the numeral indicated upon the scale by the indicator finger 5.

A bar 19 is slidably and non-rotatably arranged in the front wall 13 of the housing at the end of the arm 10 centrally above the slot 14 and upon the outer end of this bar is arranged a suitable grip 20 which is adapted to be grasped by the operator to pull the bar outwardly.

A compression spring 21 encircles the inward end of the bar 19 which returns it to its normal position. Secured to the underside of the bar 19 is a spring arm 22 which carries a roller 23 at its forward end, said roller being adapted to roll over the face of the type of the type plate when the bar 19 is pulled outwardly. The tension of the spring arm 22 is adjusted by means of an adjusting screw 24 so as to regulate the impression of the type.

An indicating finger 25 is secured to the inward end of the pivot pin 26 of the arm 10 and is arranged in alignment with the centre of the slot 14 and rotates with the arm 10. This finger 25 passes through a central opening in the glass covering the dial and rotates with the arm 10 so that the said finger may be brought accurately into register with the dial indicator 5 and when so brought into register the centre of the slot 14 will be aligned with the numeral corresponding with the indicated weight on the dial. A card is then inserted into the slot and the bar 19 is pulled forward and a type impression made upon the card. The type may if desired be in code characters for maintaining secret weight records.

The dial scale may be of any suitable dimension, that is to say, it may register upon the dial one hundred pounds, or one thousand pounds, or more, but as here shown it is intended to indicate up to one thousand and a special indicating device is arranged to show through the opening 27 in the dial when the weight upon the scale runs into the thousands and indicates the number of thousands. The numerals arranged on the perimeter of the flange 2 correspond with the numerals of the dial and when additional numerals are required by reason of a greater weight, a special type disc 28 is operated to bring the required numeral into register with the numerals of the type plate 4. This disc is supported in a recess 29 arranged in the upper portion of the arm 10 below the slot 14 and in radial alignment with the centre thereof and it is provided with a thumb-piece 30 by means of which it is rotated.

Suitable types 31 are inserted into the periphery of the disc and an opening 32 is arranged in the side of the arm to disclose a portion of the front face of the disc. A pointer 33 is secured in the arm and suitable character indications are arranged upon the front face to correspond with the type which is arranged opposite to the centre of the slot.

It will be understood that when the scale indicates that a certain number of thousands have been passed the thumb piece 30 is turned until the corresponding number on the front face of the disc 28 registers with the pointer 33 and the corresponding number is arranged in alignment with the type on the type plate 4. The disc may be of any size and is usually required to contain only the numerals from 0 to 9.

In the operation of this form of the device, when the weight is placed upon the scale the indicator 5 moves to show the amount of the load. The operator then by means of the hand swings the arm 10 on its pivot until the indicator finger 25 coincides with the indicator 5 and if excess numerals over the dial scale are indicated in the opening 27, the disc 28 is rotated to correspond therewith. The card is then inserted in the slot and the bar 19 pulled out and an absolute record of the weight is impressed thereon.

Figure 4:
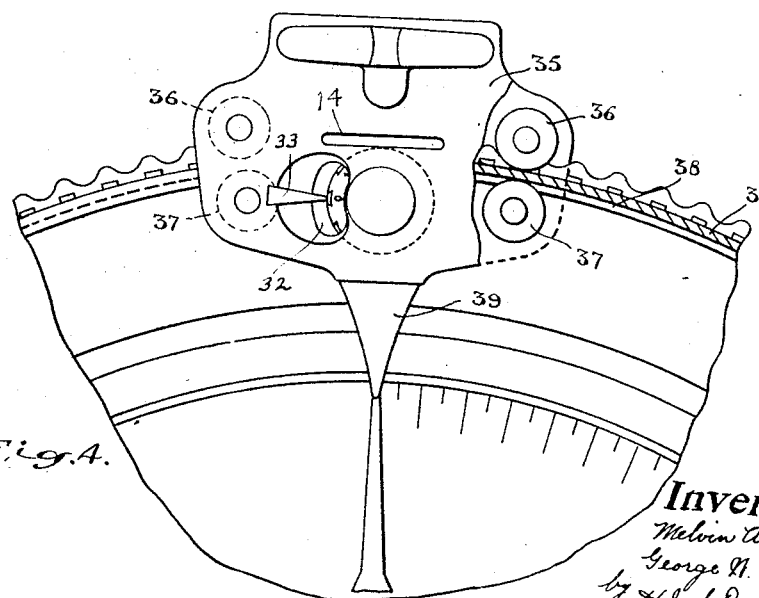
Figure 4 is an elevational detail of a modified form of the device shown upon a segment of the scale dial rim.

The form of the device shown in Figure 4 comprises a carriage 35 supported upon the outer perimeter of the flange 3 of the frame by the rollers 36 and secured in position upon the flange by a pair of rollers 37 supported from the forward side of the carriage and engaging a circumferential groove 38 in the inner side of the flange 3.

A finger 39 extends inwardly from the carriage to the outer circumference of the dial. The operating features of the printing mechanism in the latter construction are the same as in that already described, the only difference being that the carriage 35 is supported directly from the flange instead of being supported from a radial arm.

A printing device such as described can be readily designed to be applied to any type of dial scale. It is of extremely simple construction and adds very little to the cost of the machine. It will also be noted that the type plate 4 extends around the perimeter of the flange 3 and it is desirable that the type be protected from damage and protection is afforded by means of a circular guard 40 which is secured to the arm 10 or carriage 35.

What we claim as our invention is:—

1. In a dial scale recording device, the combination with the dial and a circular frame surrounding the dial, of type characters arranged on the perimeter of said dial frame, a carriage supported from and embracing said dial frame and adapted to be moved concentrically therearound being operable from the front of the dial, and means manually operable from the front of the scale supported by said carriage for taking an impression from the type.

2. In a dial scale recording device, the combination with a circular dial frame having type characters arranged around its perimeter, of a carriage embracing the perimeter of said frame and rotatable therearound, means manually operable from the front of the dial and supported on said carriage for effecting an impression of the type, a toothed ring on the perimeter of the frame having teeth corresponding with the type characters, and means supported on said carriage for engaging said toothed ring.

3. In a dial scale recording device, the combination with a circular frame encompassing the dial, recording type arranged upon said frame in radial alignment with the scale markings, a member rotatably mounted and adapted to be moved circumferentially around said frame, a bar slidably arranged in said rotatable member, a spring supported roller secured to said bar adapted to move across the face of the type to effect the impression of the type upon a recording strip, and a suitable grip arranged on the outer end of the bar.

4. A dial scale recording device, comprising a rim, type characters arranged on said rim in radial alignment with the scale markings of the dial and corresponding therewith, a rotatable member adapted to be moved around said rim, a supplementary type supporting member arranged upon said rotatable member and adapted to align with individual numerals or characters, and means for effecting the impression of the type.

5. A dial scale recording device, comprising, a rim, type characters arranged on the periphery of said rim and in radial alignment with the markings on the dial, a member adapted to be moved around said rim, a disc rotatably mounted in said rotatable member and having type characters on the perimeter thereof adapted to be moved into register with the type on the perimeter of the rim to supplement such characters, and means for effecting an impression from the type characters.

6. In a dial scale recording device, the combination with a rigid rim encompassing the dial, a succession of type characters arranged around the perimeter of said rim in radial alignment with the scale markings on the dial, a notched flange on said rim having notches coinciding with the type characters, a carriage adapted to be moved around said rim and having a pointer adapted to extend toward the dial, means for taking an impression of the type, and a spring held roller arranged on said carriage engaging the notches in said flange and holding the carriage in definite positions during the printing operation.

7. A dial scale recording device, comprising a circular rim encircling the dial having an inwardly extending rigid radial arm, an arm pivotally mounted on said rigid arm in alignment with the centre of the dial, said arm extending outwardly beyond said rim, type characters arranged on the perimeter of said rim, a slidable member secured in said arm and adapted to effect an impression of the type, and an indicating finger secured to said rotatable arm and adapted to rotate adjacent to the face of the dial and beneath the rigid arm.

8. In a dial scale recording device, the combination with a rim having type characters arranged on the perimeter, of a carriage adapted to be moved around said rim, said carriage extending each side of said rim, a spring arm secured on the inner side of said carriage having a roller at its free end, a toothed flange on said rim engaging said roller, a transversely arranged bar extending through said carriage having a compression spring arranged on its inner extremity, a spring arm secured to said bar and having a roller on its free end adapted to engage the type, and an indicating finger operating with said carriage to indicate the relative position of the carriage in respect to the scale indicating finger.

MELVIN ARVINE SWEET.
GEORGE WILLIAM BRITTON.

Witnesses:
  Geo. L. Britton,
  Arthur White.